United States Patent
Bhattad et al.

(10) Patent No.: US 11,201,658 B2
(45) Date of Patent: Dec. 14, 2021

(54) ADAPTIVE RECEIVE DIVERSITY

(71) Applicant: QUALCOMM Incorporated, San Diego, CA (US)

(72) Inventors: Kapil Bhattad, Bangalore (IN); Tanumay Datta, Bangalore (IN); Ananta Narayanan Thyagarajan, Bangalore (IN); Pravjyot Singh Deogun, Bengaluru (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/777,752

(22) Filed: Jan. 30, 2020

(65) Prior Publication Data

US 2020/0267760 A1 Aug. 20, 2020

(30) Foreign Application Priority Data

Feb. 14, 2019 (IN) .............................. 201941005824

(51) Int. Cl.
| | | |
|---|---|---|
| *H04B 7/08* | (2006.01) | |
| *H04W 74/08* | (2009.01) | |
| *H04L 1/00* | (2006.01) | |
| *H04L 5/10* | (2006.01) | |
| *H04W 72/04* | (2009.01) | |
| *H04L 5/00* | (2006.01) | |
| *H04W 24/08* | (2009.01) | |

(52) U.S. Cl.
CPC ............. *H04B 7/08* (2013.01); *H04L 1/0026* (2013.01); *H04L 5/0051* (2013.01); *H04L 5/0055* (2013.01); *H04L 5/10* (2013.01); *H04W 24/08* (2013.01); *H04W 72/042* (2013.01); *H04W 72/0413* (2013.01); *H04W 74/0808* (2013.01)

(58) Field of Classification Search
CPC ..................................... H04B 7/08; H04B 7/04
See application file for complete search history.

(56) References Cited

U.S. PATENT DOCUMENTS

| | | | |
|---|---|---|---|
| 2005/0181739 A1 | 8/2005 | Krasny et al. | |
| 2008/0259893 A1* | 10/2008 | Murata | ............... H04B 7/0871 370/342 |
| 2013/0114454 A1* | 5/2013 | Hwang | ............... B05C 11/1047 370/252 |
| 2013/0155890 A1 | 6/2013 | Bhattad et al. | |
| | (Continued) | | |

OTHER PUBLICATIONS

International Search Report and Written Opinion—PCT/US2020/016093—ISA/EPO—Apr. 24, 2020.

*Primary Examiner* — Jason E Mattis
(74) *Attorney, Agent, or Firm* — Harrity & Harrity, LLP \ Qualcomm

(57) ABSTRACT

This disclosure provides systems, methods, and apparatuses for wireless communication. In some aspects, a user equipment (UE) may enable adaptive receive diversity (RxD) by receiving an indicator for a channel occupancy time (COT), outside of the COT and in a non-RxD mode, and may transfer to the RxD mode for reception during the COT. After an end to the COT, the UE may return to the non-RxD mode. In this way, the UE enables improved power gain, diversity gain, or spatial nulling gain during a COT, and enables reduced power utilization outside of the COT.

30 Claims, 8 Drawing Sheets

(56) References Cited

U.S. PATENT DOCUMENTS

| | | | | |
|---|---|---|---|---|
| 2014/0092798 A1* | 4/2014 | Chen | .................... | H04B 1/7115 |
| | | | | 370/311 |
| 2014/0098694 A1* | 4/2014 | Damji | ............... | H04W 52/0229 |
| | | | | 370/252 |
| 2015/0237548 A1* | 8/2015 | Luo | ....................... | H04W 36/06 |
| | | | | 370/329 |
| 2015/0271755 A1* | 9/2015 | Karri | ................. | H04W 28/0221 |
| | | | | 370/252 |
| 2015/0280883 A1* | 10/2015 | Seo | ................. | H04W 72/0413 |
| | | | | 370/329 |
| 2017/0245317 A1* | 8/2017 | Lee | ......................... | H04B 7/04 |
| 2018/0115347 A1 | 4/2018 | Yerramalli et al. | | |
| 2019/0181942 A1* | 6/2019 | Tang | .................... | H04L 5/0057 |

\* cited by examiner

ADAPTIVE RECEIVE DIVERSITY

CROSS-REFERENCE TO RELATED APPLICATION

This patent application claims priority to Indian Patent Application No. 201941005824, filed on Feb. 14, 2019, entitled "ADAPTIVE RECEIVE DIVERSITY," and assigned to the assignee hereof. The disclosure of the prior application is considered part of and is incorporated by reference in this patent application.

TECHNICAL FIELD

Aspects of the present disclosure generally relate to wireless communication, and more particularly to techniques for adaptive receive diversity.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different user equipment to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a base station (BS), outside of a channel occupancy time (COT) using a first quantity of receive (Rx) antennas, and in a first mode, a command associated with indicating a start to the COT; enabling, based on receiving the command and after the start of the COT, a receive diversity (RxD) mode for the UE; receiving, while in the RxD mode and using a second quantity of Rx antennas, one or more communications based on enabling the RxD mode; determining an end to the COT; and disabling, based on determining the end to the COT, the RxD mode.

In some aspects, the apparatus of the UE is configured to use the first quantity of Rx antennas before the start of the COT, and the method may include activating a second quantity of Rx antennas for use after the start of the COT and during the RxD mode with the first quantity of Rx antennas. In some aspects, determining the end of the COT includes determining the end of the COT based on at least one of a received explicit COT indicator, a received slot format indicator (SFI), a received RxD mode signal, a wait time parameter, or a result of the BS attempting to select the COT In some aspects, the method may include transmitting, to the BS, a set of channel quality information (CQI) feedback messages to indicate a set of Rx antenna configurations for an Rx antenna selection decision. In some aspects, the method may include determining the start of the COT or the end of the COT based on signaling from a primary carrier operating on licensed spectrum. In some aspects, the method may include enabling the RxD mode based on at least one of a received message from the BS, a detected demodulation reference signal (DMRS), a detected group common physical downlink control channel (PDCCH), a detected UE-specific PDCCH, a traffic frequency determination, a signal to noise ratio metric, a received energy metric, or a preamble correlation.

In some aspects, the method may include disabling the RxD based on at least one of a received message from the BS, a failure to detect a grant for a threshold period of time, the determining the end of the COT, a traffic frequency determination, or a received energy metric. In some aspects, the method may include transmitting, to the BS, an acknowledgement (ACK) message or a negative acknowledgement (NACK) message to maintain a synchronization of the UE and the BS with respect to the RxD mode.

In some aspects, the method may include transmitting a sounding reference signal to maintain a synchronization of the UE and the BS with respect to the RxD mode. In some aspects, the method may include determining the one or more antennas for the RxD mode based on at least one of a received PDCCH, a downlink control information (DCI) field, a detection of a preamble of a PDCCH, or a determination override indicator of a PDCCH. In some aspects, the method may include determining the one or more antennas for the RxD mode. In some aspects, the method may include transmitting an uplink control information (UCI) message to the BS to indicate the one or more antennas for the RxD mode.

In some aspects, the method may include monitoring, using a first antenna of the one or more antennas, a first subband or bandwidth. In some aspects, the method may include monitoring, using a second antenna of the one or more antennas, a second subband or bandwidth. In some aspects, the method may include receiving the one or more communications using at least one of the first antenna or the second antenna, based on monitoring the first subband or bandwidth and the second subband or bandwidth. In some aspects, the method may include enabling the RxD mode based on at least one of a listen-before-talk (LBT) mode not being enabled or an LBT procedure being within a threshold period from completion.

Another innovative aspect of the subject matter described in this disclosure can be implemented in a UE for wireless communication. The UE may include memory and one or more processors operatively coupled to the memory. The memory and the one or more processors may be configured to receive, from a BS, outside of a COT using a first quantity of Rx antennas, and in a first mode, a command associated with indicating a start to the COT; enable, based on receiving the command and after the start of the COT, an RxD mode for the UE; receive, while in the RxD mode and using a second quantity of Rx antennas, one or more communications based on enabling the RxD mode; determine an end to the COT; and disable, based on determining the end to the COT, the RxD mode. In some aspects, the UE may perform one or more operations described above with regard to the method.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a BS, outside of a COT using a first quantity of Rx antennas, and in a first mode, a command associated with indicating a start to the COT; enable, based on receiving the command and after the start of the COT, an RxD mode for the UE; receive, while in the RxD mode and using a second quantity of Rx antennas, one or more communications based on enabling the RxD mode; determine an end to the COT; and disable, based on determining the end to the COT, the RxD mode. In some aspects, the one or more instructions may cause the one or more processors to perform one or more operations described above with regard to the method.

Another innovative aspect of the subject matter described in this disclosure can be implemented in an apparatus for wireless communication. The apparatus may include means for receiving, from a BS, outside of a COT using a first quantity of Rx antennas, and in a first mode, a command associated with indicating a start to the COT; means for enabling, based on receiving the command and after the start of the COT, an RxD mode for the apparatus; means for receiving, while in the RxD mode and using a second quantity of Rx antennas, one or more communications based on enabling the RxD mode; means for determining an end to the COT; and means for disabling, based on determining the end to the COT, the RxD mode. In some aspects, the apparatus may perform one or more operations described above with regard to the method.

One innovative aspect of the subject matter described in this disclosure can be implemented in a method of wireless communication performed by an apparatus of a BS. The method may include transmitting, to a UE using a first quantity of Rx antennas and in a first mode, outside of a COT, a command associated with indicating a start to the COT; transmitting, after transmitting the command, one or more first communications to the UE for receipt using a second quantity of Rx antennas in an RxD mode; determining, after transmitting the one or more first communications, an end to the COT; and transmitting, after the end to the COT, one or more second communications to the UE for receipt using the first quantity of Rx antennas in the first mode.

In some aspects, the apparatus of the BS may indicate, to the UE, the end of the COT using at least one of an explicit COT indicator, an SFI, an RxD mode signal, or an attempt to select the COT. In some aspects, the apparatus of the BS may receive, from the UE, a set of CQI feedback messages to indicate a set of Rx antenna configurations for an Rx antenna selection decision. In some aspects, the apparatus of the BS may indicate, to the UE, the start of the COT or the end of the COT using signaling on a primary carrier operating on licensed spectrum.

In some aspects, the apparatus of the BS may transmit signaling to cause the UE to enable the RxD mode, and the signaling is at least one of an RxD mode activation message, a DMRS, a group common PDCCH, a UE-specific PDCCH, or an indication of a measurement. In some aspects, the apparatus of the BS may transmit signaling to cause the UE to disable the RxD mode, and the signaling is at least one of an RxD mode deactivation message from the apparatus of the BS, an indication of the end of the COT, an indication of a measurement. In some aspects, the apparatus of the BS may forgo transmitting an indication of a grant to the UE to cause the UE to disable the RxD mode.

In some aspects, the apparatus of the BS may receive, from the UE, an ACK message or a NACK message associated with maintaining a synchronization of the UE and the BS with respect to the RxD mode. In some aspects, the apparatus of the BS may receive a sounding reference signal associated with maintaining a synchronization of the UE and the BS with respect to the RxD mode.

In some aspects, the apparatus of the BS may transmit, to the UE, signaling to enable a determination of one or more Rx antennas for the RxD mode, and the signaling is at least one of a PDCCH, a DCI field, a preamble of a PDCCH, an override indicator of a PDCCH. In some aspects, the apparatus of the BS may receive a UCI message, from the UE, indicating the one or more antennas for the RxD mode.

Another innovative aspect of the subject matter described in this disclosure can be implemented in a BS for wireless communication. The BS may include memory and one or more processors operatively coupled to the memory. The memory and the one or more processors may be configured to transmit, to a UE using a first quantity of Rx antennas and in a first mode, outside of a COT, a command associated with indicating a start to the COT; transmit, after transmitting the command, one or more first communications to the UE for receipt using a second quantity of Rx antennas in an RxD mode; determine, after transmitting the one or more first communications, an end to the COT; and transmit, after the end to the COT, one or more second communications to the UE for receipt using the first quantity of Rx antennas in the first mode.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit, to a UE using a first quantity of Rx antennas and in a first mode, outside of a COT, a command associated with indicating a start to the COT; transmit, after transmitting the command, one or more first communications to the UE for receipt using a second quantity of Rx antennas in an RxD mode; determine, after transmitting the one or more first communications, an end to the COT; and transmit, after the end to the COT, one or more second communications to the UE for receipt using the first quantity of Rx antennas in the first mode.

Another innovative aspect of the subject matter described in this disclosure can be implemented in an apparatus for wireless communication. The apparatus may include means for transmitting, to a UE using a first quantity of Rx antennas and in a first mode, outside of a COT, a command associated with indicating a start to the COT; transmitting, after transmitting the command, one or more first communications to the UE for receipt using a second quantity of Rx antennas in an RxD mode; determining, after transmitting the one or more first communications, an end to the COT; and transmitting, after the end to the COT, one or more second communications to the UE for receipt using the first quantity of Rx antennas in the first mode.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the Figures is provided for the purposes of illustration and description, and not as a definition of the limits of the claims.

BRIEF DESCRIPTION OF THE DRAWINGS

Like reference numbers and designations in the various drawings indicate like elements.

DETAILED DESCRIPTION

Figure 1:
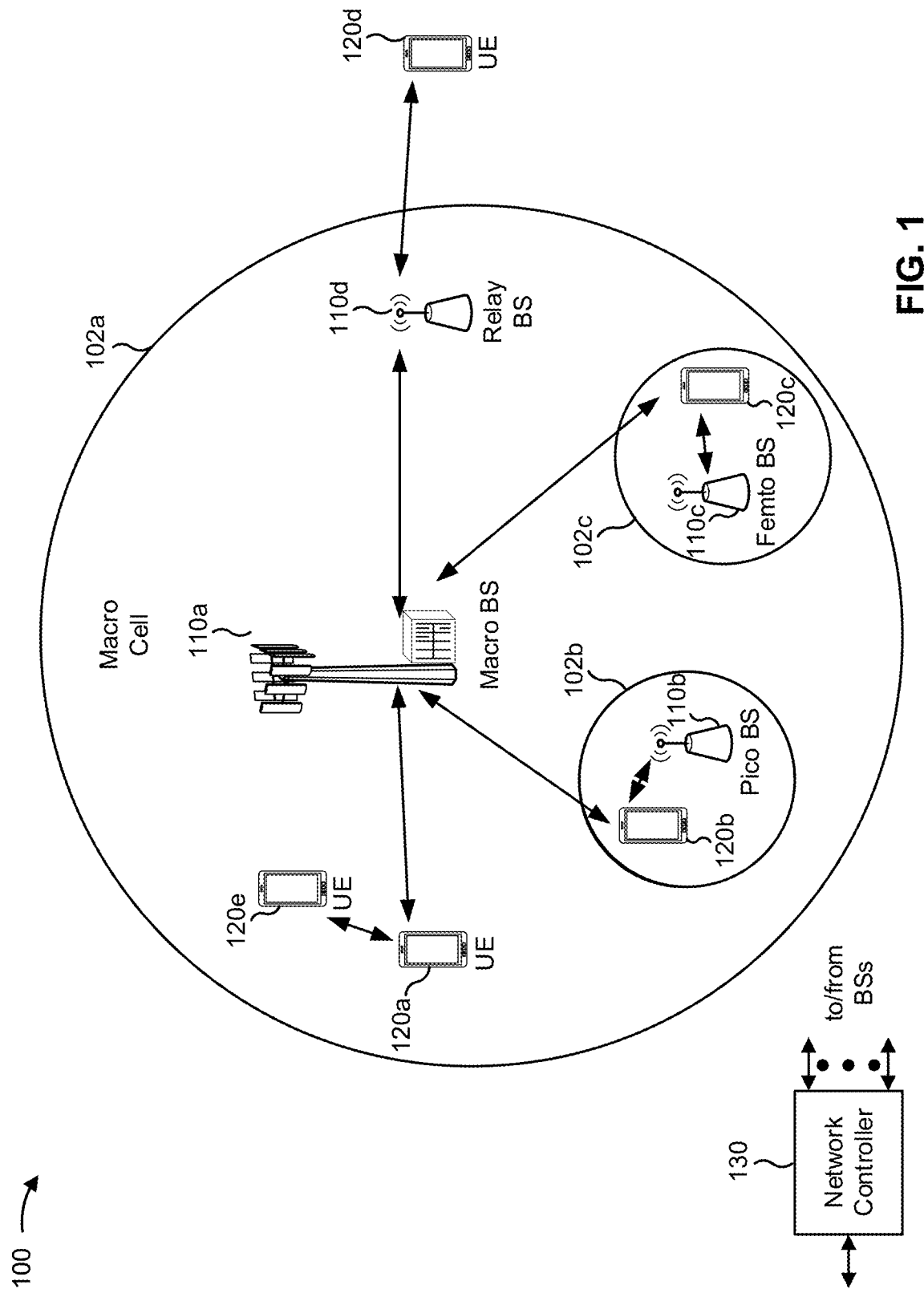
FIG. 1 is a block diagram conceptually illustrating an example of a wireless network.

Various aspects of the disclosure are described more fully hereinafter with reference to the accompanying drawings. This disclosure may, however, be implemented in many different forms and may not be construed as limited to any specific structure or function presented throughout this disclosure. Rather, these aspects are provided so that this disclosure will be thorough and complete, and will fully convey the scope of the disclosure to one having ordinary skill in the art. Based on the teachings herein, one having ordinary skill in the art may appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It may be understood that any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is be noted that while aspects may be described herein using terminology commonly associated with 3G as well as 4G wireless technologies, aspects of the present disclosure can be applied in other generation-based communication systems, such as 5G and later, including NR technologies.

In some communications systems, such as NR, a receive diversity (RxD) mode may be used to improve a quality or a reliability of a wireless link. For example, a user equipment (UE) may use a group of multiple antennas to perform observations of a common signal transmitted on multiple channels to account for differing levels of fading, or interference associated with the multiple channels. In this case, using the RxD mode may provide power gain, diversity gain, or spatial nulling gain. However, a quantity of receive chains that are used for receive diversity may correspond to a power consumption by the UE, thus using receive diversity in a scenario where channel quality is relatively strong, may result in excess utilization of power resources. Further, in cases where single antenna signal-to-noise ratio (SNR) satisfies a threshold or when SNR with receive diversity does not satisfy a threshold, using receive diversity may result in excess utilization of power resources without a corresponding improvement in communication success likelihood.

In a contention-based channel access scheme, a base station (BS) may contend for channel access, such as using a listen-before-talk (LBT) procedure. The BS may transmit a physical downlink control channel (PDCCH) to indicate a channel occupancy time (COT) for which the BS has reserved resources using a contention-based channel access scheme. The UE may receive an initial signal, such as a PDCCH demodulation reference signal (DMRS), or preamble, and may decode the initial signal or preamble to determine that the BS is to subsequently transmit the PDCCH. The UE may be capable of decoding the initial signal or preamble at a relatively low SNR, but may use a relatively higher SNR for decoding a subsequent PDCCH or physical downlink shared channel (PDSCH). Thus, the UE may decode the initial signal or preamble without using receive diversity but may improve a likelihood of successfully decoding the subsequent PDCCH or PDSCH by enabling an RxD mode to provide receive diversity.

Some aspects described herein provide adaptive receive diversity. For example, a UE may use a first quantity of receive (Rx) antennas and operate in a non-receive diversity (non-RxD) mode to receive a preamble and may transfer to using a second quantity of Rx antennas, such as the first quantity of Rx antennas with additional Rx antennas added, in an RxD mode to receive a PDCCH during a COT. In this case, at an end of the COT, the UE may transfer from the RxD mode to the non-RxD mode and from using the second quantity of antennas to using the first quantity of antennas.

Particular implementations of the subject matter described in this disclosure can be implemented to realize one or more of the following potential advantages. For example, the UE may selectively use the RxD mode to enable power saving for preamble reception. Moreover, the UE may selectively use the RxD mode to improve quality or reliability for PDCCH reception.

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as the BS 110a, the BS 110b, the BS 110c, and the BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with the macro BS 110a and a UE 120d in order to facilitate communication between the BS 110a and the UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

The UEs 120 (for example, 120a, 120b, 120c) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). The UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as the UE 120a and the UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
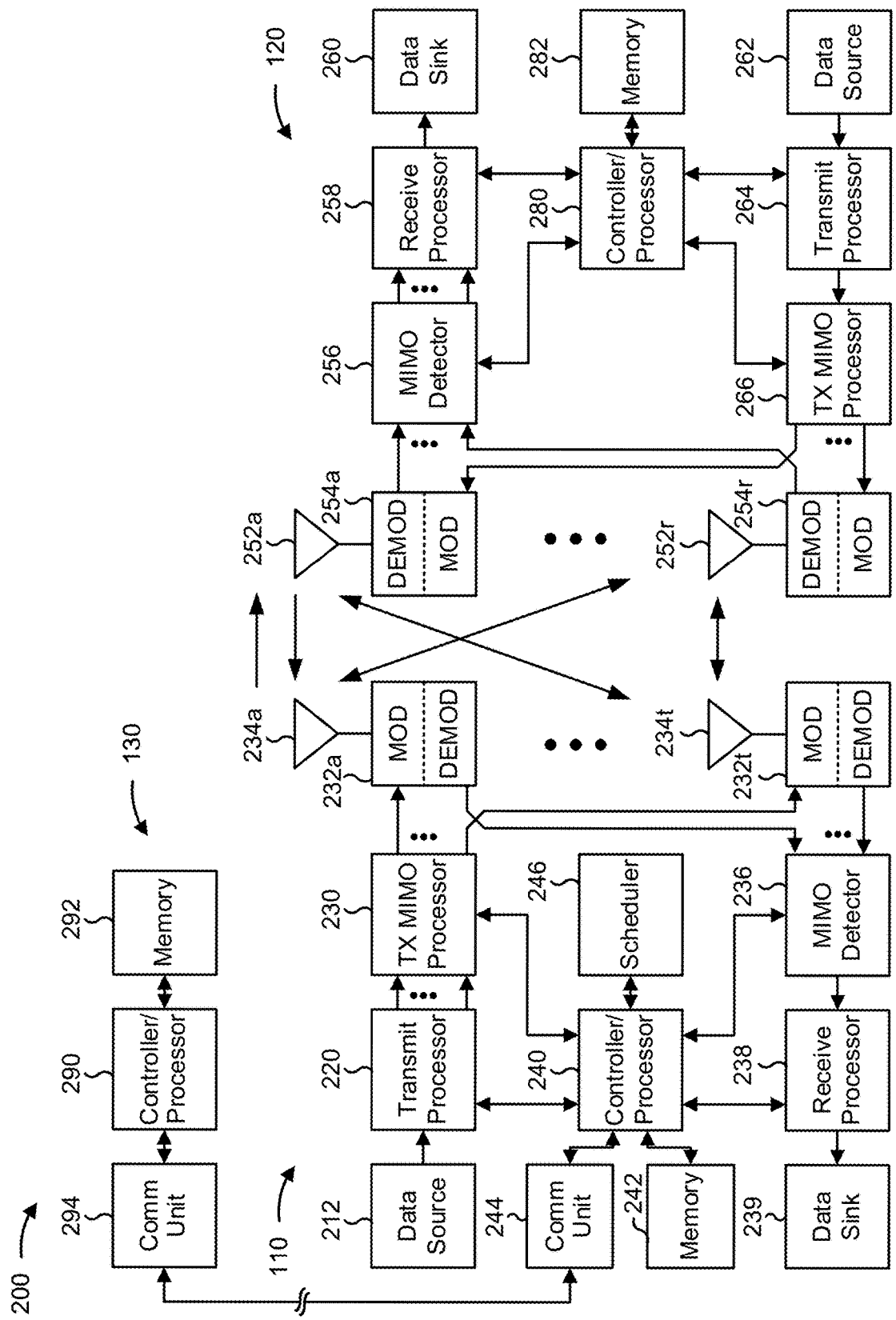
FIG. 2 is a block diagram conceptually illustrating an example of a BS in communication with a UE in a wireless network.

FIG. 2 is a block diagram conceptually illustrating an example 200 of a base station 110 in communication with a UE 120. In some aspects, the base station 110 and the UE 120 may respectively be one of the base stations and one of the UEs in the wireless network 100 of FIG. 1. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. A transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from a controller/processor 280. The transmit processor 264 also may generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, etc.), and transmitted to the base station 110. At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. A receive processor 238 may provide the decoded data to a data sink 239 and the decoded control information to a controller or processor (controller/processor) 240. The base station 110 may include a communication unit 244 and communicate to a network controller 130 via a communication unit 244. The network controller 130 may include a communication unit 294, a controller or processor (controller/processor) 290, and a memory 292.

The controller/processor 240 of the base station 110, the controller/processor 280 of the UE 120, or any other component(s) of FIG. 2 may perform one or more techniques associated with adaptive receive diversity, as described in more detail elsewhere herein. For example, the controller/processor 240 of the base station 110, the controller/processor 280 of the UE 120, or any other component(s) (or combinations of components) of FIG. 2 may perform or direct operations of, for example, a process 600 of FIG. 6, a process 700 of FIG. 7, or other processes as described herein. The memories 242 and 282 may store data and program codes for the base station 110 and the UE 120, respectively. A scheduler 246 may schedule UEs for data transmission on the downlink, the uplink, or a combination thereof.

Figure 6:
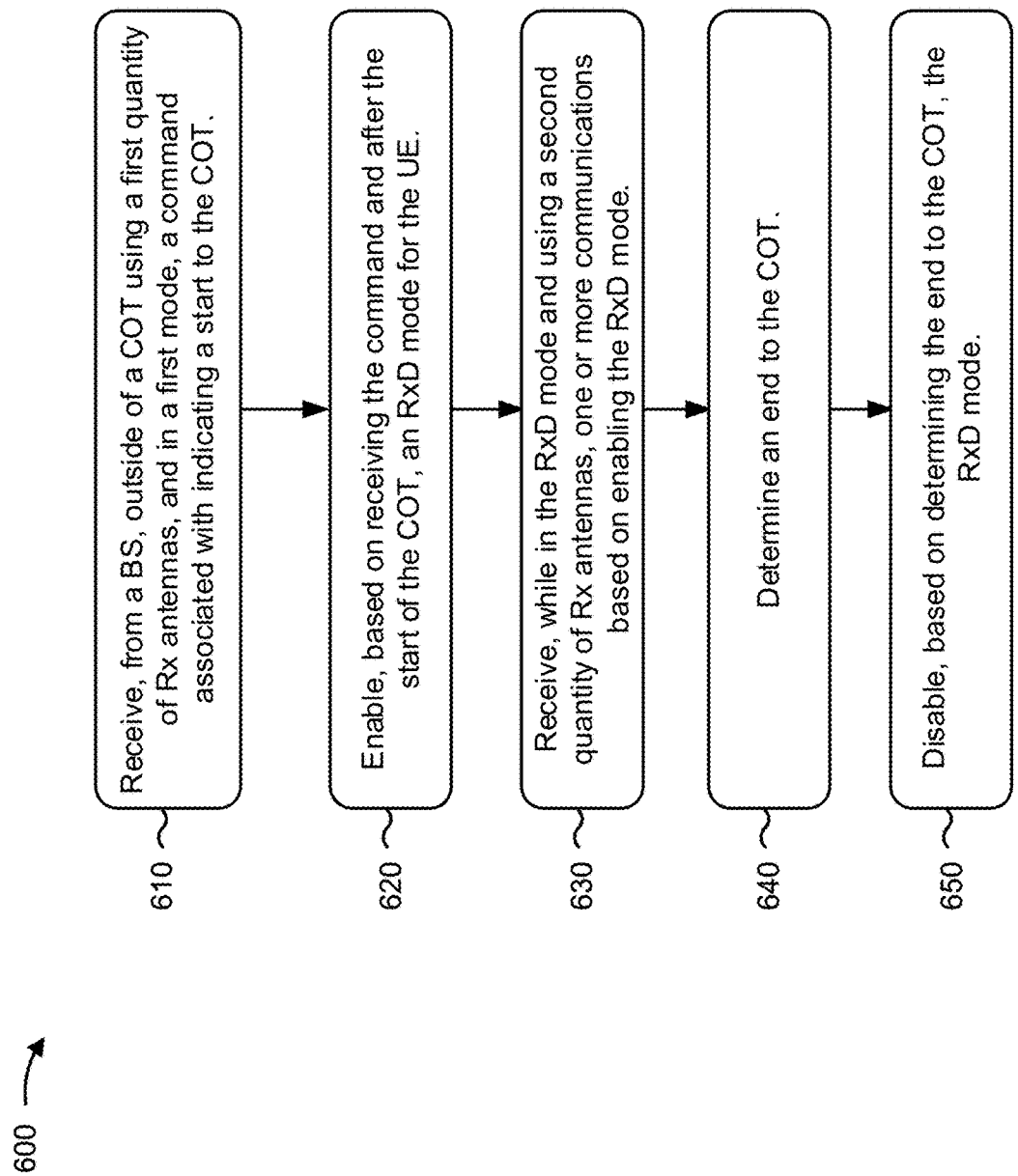
FIG. 6 is a diagram illustrating an example process performed, for example, by a UE.
Figure 7:
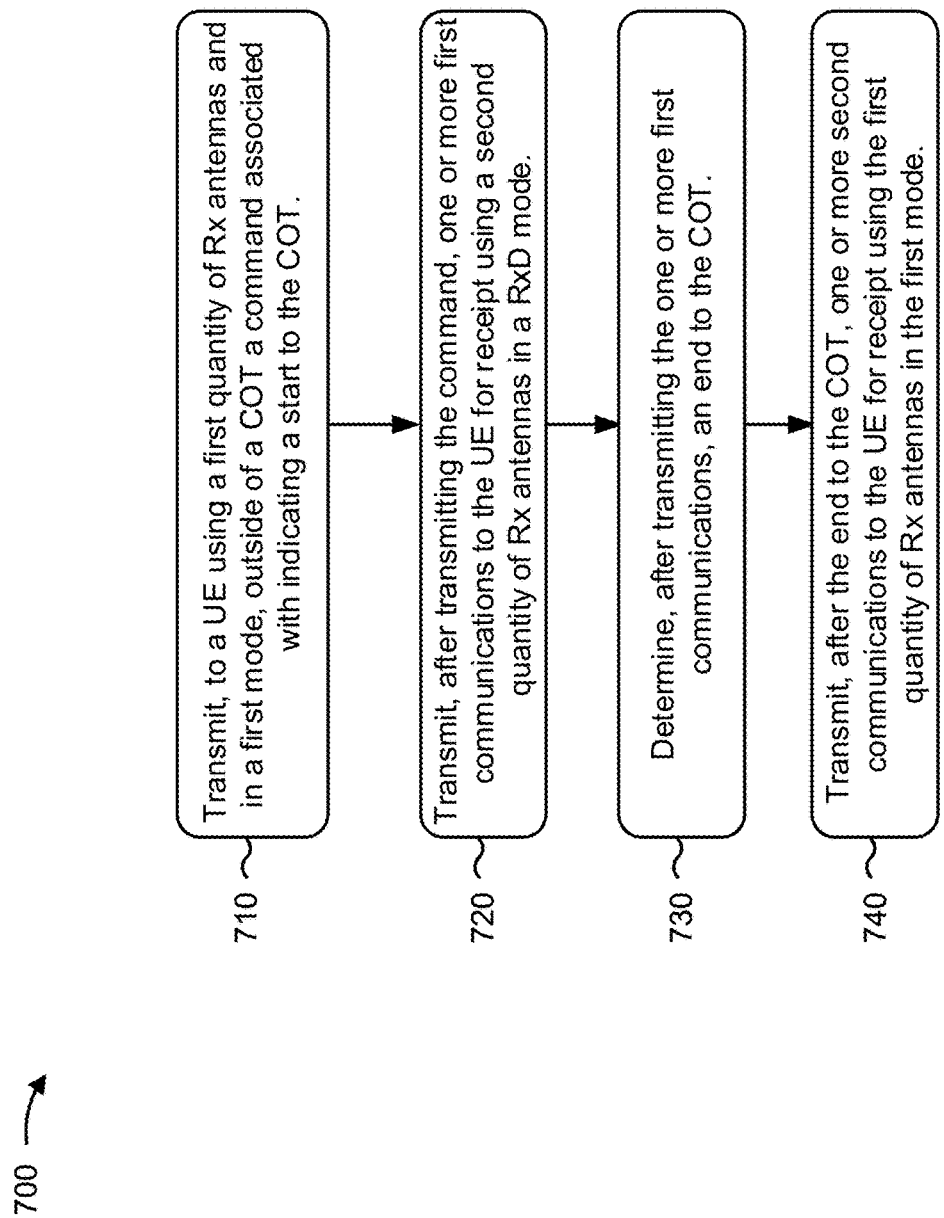
FIG. 7 is a diagram illustrating an example process performed, for example, by a BS.

The stored program codes, when executed by the controller/processor 240, the controller/processor 280, or other processors and modules at the BS 110, the UE 120, or other devices, may cause the BS 110, the UE 120, or other devices to perform operations described with respect to the process 600 of FIG. 6, the process 700 of FIG. 7, or other processes as described herein.

In some aspects, the UE 120 may include means for receiving, from a base station (BS), outside of a channel occupancy time (COT), using a first quantity of receive (Rx) antennas, and in a first mode, a command associated with indicating a start to the COT, means for enabling, based on receiving the command and after the start of the COT, a receive diversity (RxD) mode for the UE 120, means for receiving, while in the RxD mode and using a second quantity of Rx antennas, one or more communications based on enabling the RxD mode, means for determining an end to the COT, means for disabling, based on determining the end to the COT, or the RxD mode, or combinations thereof. In some aspects, such means may include one or more components of the UE 120 described in connection with FIG. 2.

In some aspects, the BS 110 may include means for transmitting, to the UE 120 using a first quantity of Rx antennas and in a first mode, outside of a COT, a command associated with indicating a start to the COT, means for transmitting, after transmitting the command, one or more first communications to the UE for receipt using a second quantity of Rx antennas in an RxD mode, means for determining, after transmitting the one or more first communications, an end to the COT, means for transmitting, after the end to the COT, one or more second communications to the UE for receipt using the first quantity of Rx antennas in the first mode, or combinations thereof. In some aspects, such means may include one or more components of the BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3A:
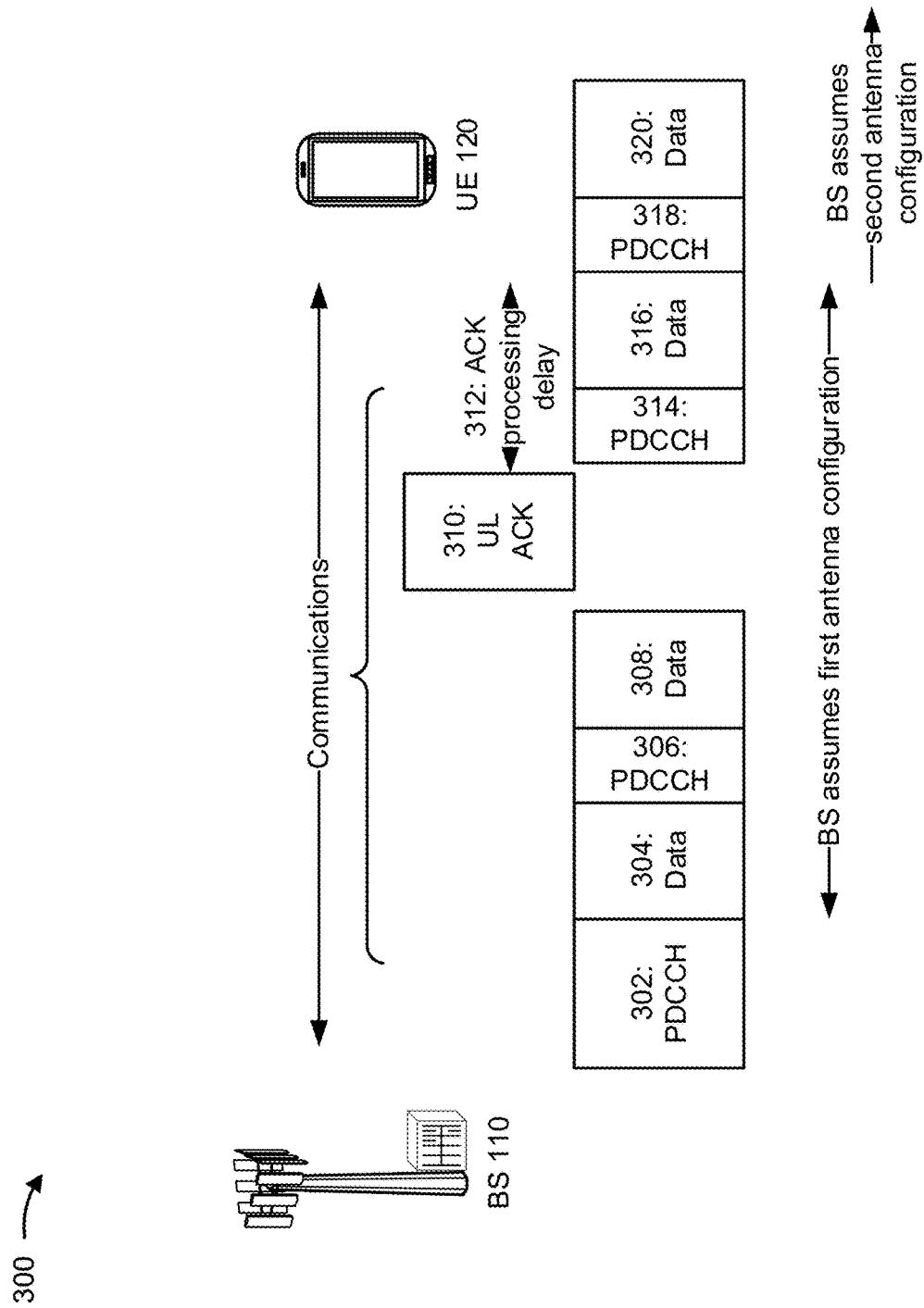
FIGS. 3A, 3B, 4 and 5 are diagrams illustrating examples of adaptive receive diversity.
Figure 3B:
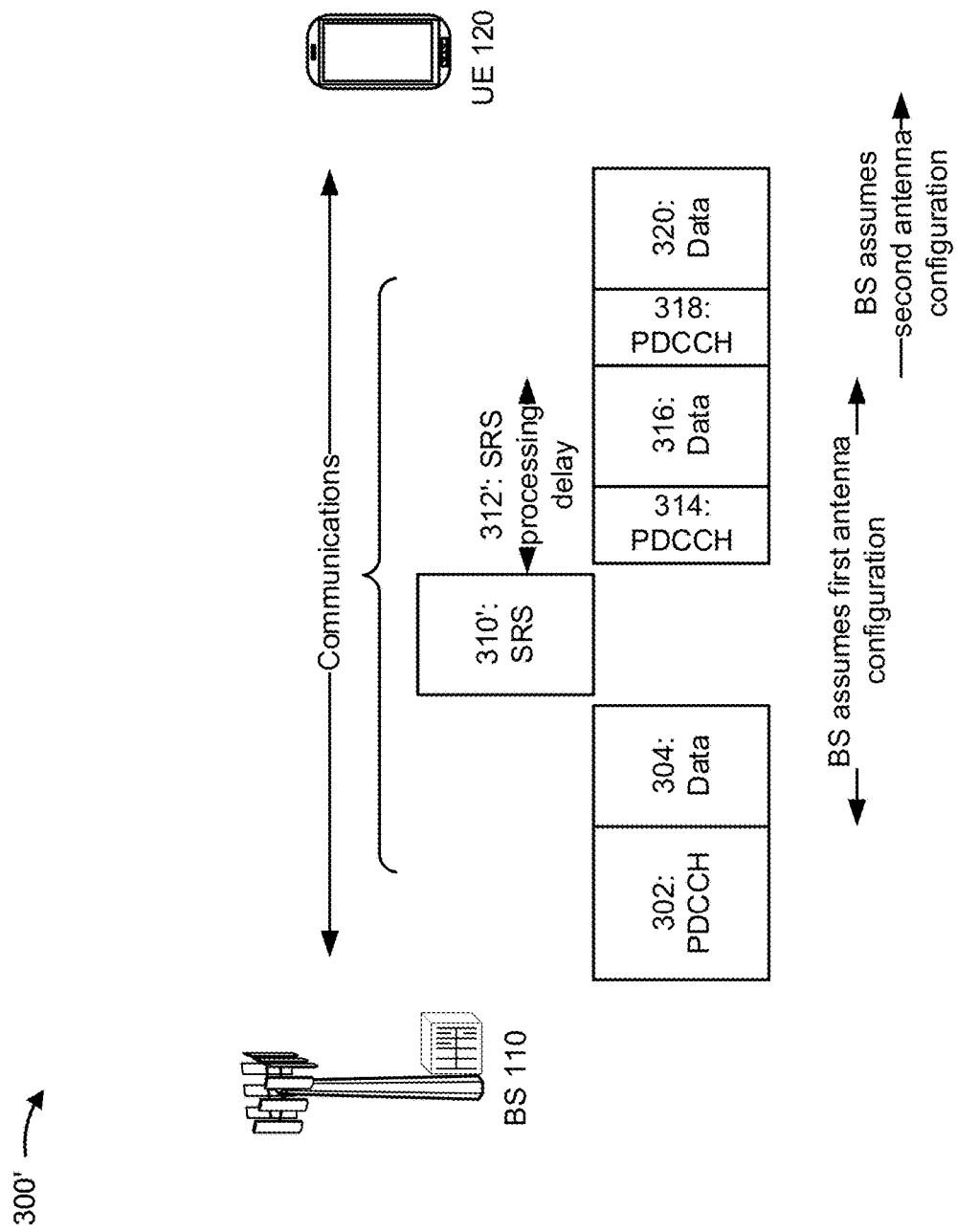

FIGS. 3A and 3B are diagrams illustrating examples 300/300' of adaptive receive diversity. As shown in FIGS. 3A and 3B, examples 300/300' may include a BS 110 communicating with a UE 120.

As further shown in FIG. 3A, the BS 110 may transmit, and the UE 120 may receive, a command associated with indicating a start to a channel occupancy time (COT). For example, the BS 110 may transmit a PDCCH 302 to the UE 120, which may be operating in a non-receive diversity (non-RxD) mode. In this case, PDCCH 302 may include an instruction for the UE 120 to alter a quantity of antennas that the UE 120 is to use for reception based on the COT starting. In some aspects, the UE 120 may receive PDCCH 302 using a first quantity of antennas associated with a first antenna configuration, and may determine to transmit an uplink acknowledgement message to indicate that the UE 120 is to change to a second quantity of antennas, as described in more detail herein. In this case, the UE 120 may determine to enable the RxD mode after transmission of the uplink acknowledgement message.

In some aspects, the UE 120 may determine to transfer to the RxD mode based on another type of indicator. For example, the UE 120 may determine to transfer to the RxD mode based on receiving a demodulation reference signal (DMRS), a group-common PDCCH (GC-PDCCH), as described in more detail below, a UE-specific PDCCH, as described in more detail below, or a metric. In this case, the metric may be a traffic frequency metric, such as based on a threshold quantity of PDCCHs being transmitted within a threshold quantity of slots, a signal to noise ratio (SNR) value, a received energy metric, such as a received signal strength indicator (RSSI), or a preamble correlation indicator.

In some aspects, the UE 120 may transmit feedback information to the BS 110 to enable the BS 110 to perform an Rx antenna selection decision. For example, the UE 120 may transmit a channel quality indicator (CQI) feedback message, such as a 1 Rx antenna CQI, a 2 Rx antenna CQI, a 4 Rx antenna CQI, etc., to the BS 110. In some aspects, the instruction for the UE 120 to alter the quantity of antennas may be associated with a particular carrier. For example, when operating in a license assisted access (LAA) mode, the BS 110 may transmit the instruction for a primary carrier, such as a cell using licensed spectrum, to cause a change, such as to enable or disable the RxD mode, to a reception of a secondary carrier.

In some aspects, the BS 110 or the UE 120 may determine to activate the RxD mode based on an effect to a network parameter. For example, the UE 120 may determine to activate the RxD mode based on determining that activating the RxD mode is to improve data detection or throughput. In contrast, the UE 120 may determine not to activate the RxD mode during a COT based on determining that the RxD mode is to cause a phase change for a radio frequency. In this case, the UE 120 may delay activating the RxD mode until a next COT after a current COT.

As further shown in FIG. 3A, the BS 110 transmits data 304, a PDCCH 306, and data 308 for reception using the first quantity of antennas. After receiving data 308, the UE 120 uses a resource to transmit an uplink acknowledgement message (UL ACK) 310 to the BS 110. A processing delay 312 may be associated with the BS 110 receiving and processing UL ACK 310. During the processing delay 312, the BS 110 may transmit a PDCCH 314 and data 316 for reception by the UE 120 using the first quantity of antennas. After the processing delay 312, the BS 110 transmits a PDCCH 318 and data 320 to the UE 120 for reception using the second quantity of antennas associated with a second antenna configuration. In this case, the UE 120 uses the second quantity of antennas to receive the PDCCH 318 and the data 320 in the RxD mode. In this way, the UE 120 switches from a non-RxD mode to an RxD mode during a COT of the BS 110.

In some aspects, the BS 110 may determine a quantity of antennas that the UE 120 is to use for reception in the RxD mode. For example, the BS 110 may determine the second quantity of antennas and may indicate the second quantity of antennas in the PDCCH 302. In this case, the PDCCH 302 may include a downlink control information (DCI) field to identify the second quantity of antennas. Additionally, or alternatively, the UE 120 may determine the second quantity of antennas. For example, the UE 120 may determine the second quantity of antennas after receiving the PDCCH 302, a GC-PDCCH, a UE-specific PDCCH, or a preamble. In some aspects, the BS 110 may signal a first value for the second quantity of antennas, and the UE 120 may determine a second value for the second quantity of antennas that is different from the first value. In this case, the UE 120 may transmit an indicator of the second quantity of antennas with the UL ACK 310. In some aspects, the UE 120 may assign different antennas to monitor different subbands or different bandwidths. For example, the UE 120 may assign all Rx antennas to monitor a primary subband, but only a subset of Rx antennas to also monitor one or more other, non-primary subbands. In this way, the UE 120 achieves power savings on the Rx antennas that do not monitor the other, non-primary subbands.

In some aspects, the BS 110 may optimize a transmission schedule for the UE 120. For example, when the UE 120 activates the RxD mode based on receiving a PDCCH, the BS 110 may schedule multiple PDCCHs or PDSCHs in a single slot. In this case, a first PDSCH or PDCCH may be a lower rank, corresponding to the first quantity of antennas, and the second PDSCH or PDCCH may be a higher rank, corresponding to the second quantity of antennas. Additionally, or alternatively, the BS 110 and the UE 120 may optimize a discontinuous reception (DRX) cycle for the UE 120. For example, the BS 110 and the UE 120 may use a first DRX cycle for the first quantity of antennas and a second, different DRX cycle for the second quantity of antennas.

As shown in FIG. 3B, in example 300', the BS 110 may transmit PDCCH 302 to schedule a sounding reference signal (SRS) 310', which the UE 120 may transmit to confirm a change from the first antenna configuration to the second antenna configuration. In this case, after an SRS processing delay 312', the UE 120 may transition to using the second antenna configuration, and the BS 110 may transmit the PDCCH 318 and the data 320 for reception using the second quantity of antennas associated with the second antenna configuration. In this way, by transmitting the SRS 310' (or by transmitting UL ACK 310), the UE 120 maintains synchronization of an RxD mode state with the BS 110.

In some aspects, subsequently, the UE 120 may determine an end to the COT, and may disable the RxD mode. In other words, the UE 120 may transition back to using the first quantity of antennas. For example, the UE 120 may receive explicit signaling indicating an end to a COT, such as information identifying a system frame indicator (SFI), or explicit signaling indicating that the UE 120 is to disable the RxD mode, such as another PDCCH. In some aspects, the UE 120 may determine to disable the RxD mode after a threshold delay. For example, the UE 120 may determine that the BS 110 has acquired subsequent resources of another COT and may remain in the RxD mode. In contrast, when the BS 110 has not acquired subsequent resources of another COT, the UE 120 may transfer to a non-RxD mode. Additionally, or alternatively, the UE 120 may determine to disable the RxD mode based on failing to detect a grant from the BS 110 for a threshold period of time, based on a traffic density metric, such as less than a threshold quantity of PDCCHs being transmitted within a threshold quantity of slots, or based on an energy metric, such as an RSRP.

Figure 4:
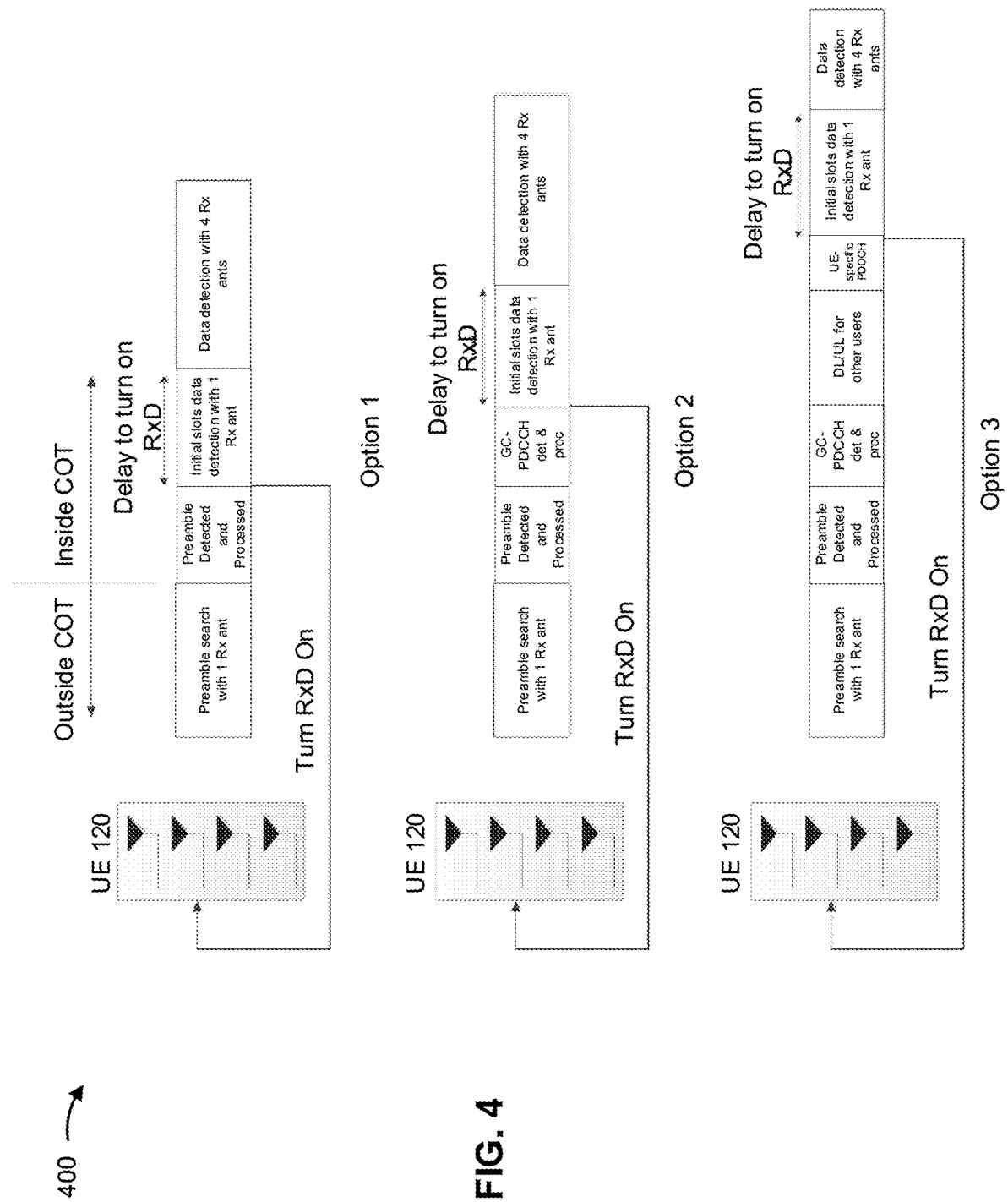

FIG. 4 is a diagram illustrating an example 400 of adaptive receive diversity. FIG. 4 shows example options for enabling an RxD mode.

As shown in FIG. 4, and by option 1, before a COT has started, the UE 120 may perform a preamble search with, for example, a single receive (Rx) antenna. Based on the preamble search and after a start of the COT, the UE 120 may detect and may process a preamble. In this case, based on detecting and processing the preamble, the UE 120 may determine to turn a group of additional Rx antennas on and transfer to the RxD mode. In contrast, if the UE 120 detects the preamble with less than a threshold amount of energy, the UE 120 may determine to activate additional Rx antennas to increase a likelihood of detecting a next preamble. In this case, if the UE 120 does not detect a next preamble, the UE 120 may return to using the single Rx antenna to reduce power utilization. In some aspects, transferring to the RxD mode may be associated with a threshold time delay, during which the UE 120 may receive data with the single Rx antenna. After a delay associated with transferring to the RxD mode, the UE 120 may receive data using multiple (4) Rx antennas. In contrast, if a received signal strength indication (RSSI) for the BS 110 satisfies a threshold, the UE 120 may determine not to activate the RxD mode and may receive data using a single Rx antenna.

As further shown in FIG. 4, and by option 2, rather than activating the RxD mode based on receiving the preamble, after detecting and processing the preamble, the UE 120 may detect and process a group-common PDCCH (GC-PDCCH). In this case, based on detecting and processing the GC-PDCCH, the UE 120 may determine to activate the group of additional Rx antennas and transfer to the RxD mode. In contrast, as shown by option 3, rather than activating the RxD mode based on detecting and processing the GC-PDCCH, the UE 120 may receive a UE-specific PDCCH. In this case, based on detecting and processing the UE-specific PDCCH, which may be transmitted after downlink or uplink communications triggered by the GC-PDCCH and associated with other UEs 120, the UE 120 may activate the group of additional Rx antennas and transfer to the RxD mode.

Figure 5:
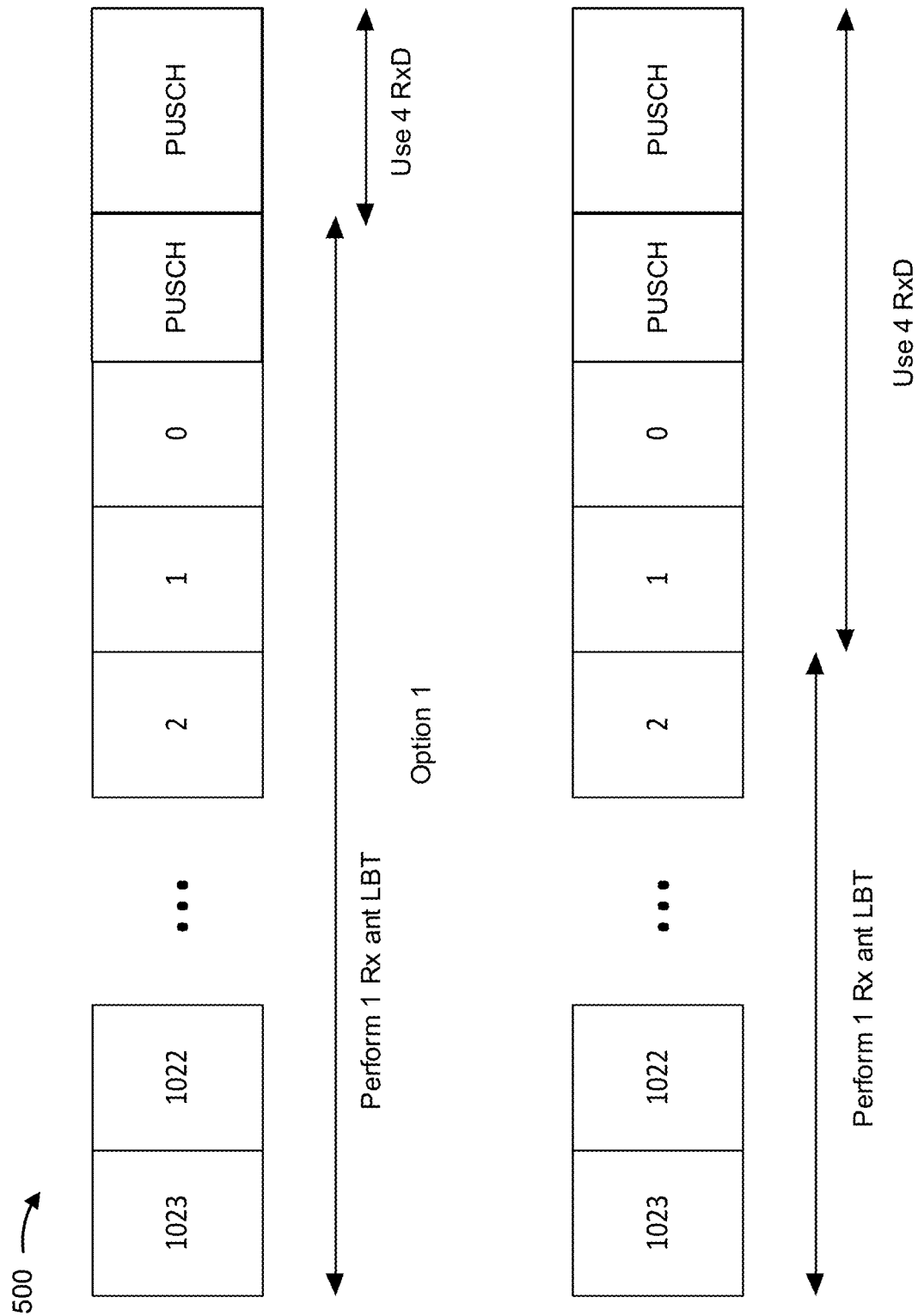

FIG. 5 is a diagram illustrating an example 500 of adaptive receive diversity. FIG. 5 shows an example of adaptive receive diversity for a listen-before-talk procedure for contention-based access.

As shown in FIG. 5, and by option 1, the UE 120 may perform a listen-before-talk (LBT) procedure using a single Rx antenna. For example, the UE 120 may perform the LBT procedure during a set of slots 1023, 1022, . . . 2, 1, 0, etc. In this case, the UE 120 may transmit a first PUSCH using the single Rx antenna after the LBT procedure. Further, after transmitting the first PUSCH, the UE 120 may transfer to the RxD mode, and may use multiple antennas (4 antennas) to transmit subsequent PUSCHs. In contrast, as shown by option 2, the UE 120 may perform a first portion of the LBT procedure using the single Rx antenna. In this case, after the first portion of the LBT procedure, such as a threshold quantity of resources before transmission, the UE 120 may transfer to the RxD mode and may use multiple Rx antennas for a second portion of the LBT procedure. In this case, based on having already transferred to using the multiple Rx antennas, the UE 120 may use the multiple Rx antennas for all of the PUSCH transmissions.

FIG. 6 is a diagram illustrating an example process 600 performed, for example, by a UE. The example process 600 shows where a UE, such as the UE 120, performs operations associated with enabling adaptive receive diversity.

As shown in FIG. 6, in some aspects, the process 600 may include receiving, from a BS, outside of a COT, using a first quantity of Rx antennas, and in a first mode, a command associated with indicating a start to the COT (block 610). For example, the UE (using, for example, receive processor 258, transmit processor 264, controller/processor 280, or memory 282) may receive, from a BS, outside of a COT, using a first quantity of Rx antennas, and in a first mode, a command associated with indicating a start to the COT, as described above.

As shown in FIG. 6, in some aspects, the process 600 may include enabling, based on receiving the command and after the start of the COT, an RxD mode for the UE (block 620). For example, the UE (using, for example, receive processor 258, transmit processor 264, controller/processor 280, or memory 282) may enable, based on receiving the command and after the start of the COT, an RxD mode for the UE, as described above.

As shown in FIG. 6, in some aspects, the process 600 may include receiving, while in the RxD mode and using a second quantity of Rx antennas, one or more communications based on enabling the RxD mode (block 630). For example, the UE (using, for example, receive processor 258, transmit processor 264, controller/processor 280, or memory 282) may receive, while in the RxD mode and using a second quantity of Rx antennas, one or more communications based on enabling the RxD mode, as described above.

As shown in FIG. 6, in some aspects, the process 600 may include determining an end to the COT (block 640). For example, the UE (using, for example, receive processor 258, transmit processor 264, controller/processor 280, or memory 282) may determine an end to the COT, as described above.

As shown in FIG. 6, in some aspects, the process 600 may include disabling, based on determining the end to the COT, the RxD mode (block 650). For example, the UE (using, for example, receive processor 258, transmit processor 264, controller/processor 280, or memory 282) may disable, based on determining the end to the COT, the RxD mode, as described above.

The process 600 may include additional aspects, such as any single implementation or any combination of aspects described below or in connection with one or more other processes described elsewhere herein.

In a first aspect, the UE is configured to use the first quantity of Rx antennas before the start of the COT. In a second aspect, alone or in combination with the first aspect, the UE may activate a second quantity of Rx antennas for use after the start of the COT and during the RxD mode with the first quantity of Rx antennas. In a third aspect, alone or in combination with one or more of the first and second aspects, determining the end of the COT includes determining the end of the COT based on at least one of a received explicit COT indicator, a received SFI, a received RxD mode signal, a wait time parameter, or a result of the BS attempting to select the COT.

In a fourth aspect, alone or in combination with one or more of the first through third aspects, the UE may transmit, to the BS, a set of CQI feedback messages to indicate a set of Rx antenna configurations for an Rx antenna selection decision. In a fifth aspect, alone or in combination with one or more of the first through fourth aspects, the UE may determine the start of the COT or the end of the COT based on signaling from a primary carrier operating on licensed spectrum. In a sixth aspect, alone or in combination with one or more of the first through fifth aspects, the UE may enable the RxD mode based on at least one of a received message from the BS, a detected DRMS, a detected group common PDCCH, a detected UE-specific PDCCH, a traffic frequency determination, a signal to noise ratio metric, a received energy metric, or a preamble correlation.

In a seventh aspect, alone or in combination with one or more of the first through sixth aspects, the UE may disable the RxD based on at least one of a received message from the BS, a failure to detect a grant for a threshold period of time, the determining the end of the COT, a traffic frequency determination, or a received energy metric. In an eighth aspect, alone or in combination with one or more of the first through seventh aspects, the UE may transmit, to the BS, an ACK message or a NACK message to maintain a synchronization of the UE and the BS with respect to the RxD mode.

In a ninth aspect, alone or in combination with one or more of the first through eighth aspects, the UE may transmit a sounding reference signal to maintain a synchronization of the UE and the BS with respect to the RxD mode. In a tenth aspect, alone or in combination with one or more of the first through ninth aspects, the UE may determine the one or more antennas for the RxD mode based on at least one of a received PDCCH, a DCI field, a detection of a preamble of a PDCCH, or a determination override indicator of a PDCCH. In an eleventh aspect, alone or in combination with one or more of the first through tenth aspects, the UE may determine the one or more antennas for the RxD mode. In a twelfth aspect, alone or in combination with one or more of the first through eleventh aspects, the UE may transmit a UCI message to the BS to indicate the one or more antennas for the RxD mode.

In a thirteenth aspect, alone or in combination with one or more of the first through twelfth aspects, the UE may monitor, using a first antenna of the one or more antennas, a first subband or bandwidth. In a fourteenth aspect, alone or in combination with one or more of the first through thirteenth aspects, the UE may monitor, using a second antenna of the one or more antennas, a second subband or bandwidth. In a fifteenth aspect, alone or in combination with one or more of the first through fourteenth aspects, the UE may receive the one or more communications using at least one of the first antenna or the second antenna, based on monitoring the first subband or bandwidth and the second subband or bandwidth. In a sixteenth aspect, alone or in combination with one or more of the first through fifteenth aspects, the UE may enable the RxD mode based on at least one of an LBT mode not being enabled or an LBT procedure being within a threshold period from completion.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

FIG. 7 is a diagram illustrating an example process 700 performed, for example, by a BS. The example process 700 shows where a BS, such as the BS 110, performs operations associated with enabling adaptive receive diversity.

As shown in FIG. 7, in some aspects, the process 700 may include transmitting, to a UE using a first quantity of Rx antennas and in a first mode, outside of a COT, a command associated with indicating a start to the COT (block 710). For example, the BS (using, for example, controller/processor 240, transmit processor 220, TX MIMO processor 230, MOD 232, or antenna 234) may transmit, to a UE using a first quantity of Rx antennas and in a first mode, outside of a COT, a command associated with indicating a start to the COT, as described above.

As shown in FIG. 7, in some aspects, the process 700 may include transmitting, after transmitting the command, one or more first communications to the UE for receipt using a second quantity of Rx antennas in an RxD mode (block 720). For example, the BS (using, for example, controller/processor 240, transmit processor 220, TX MIMO processor 230, MOD 232, or antenna 234) may transmit, after transmitting the command, one or more first communications to the UE for receipt using a second quantity of Rx antennas in an RxD mode, as described above.

As shown in FIG. 7, in some aspects, the process 700 may include determining, after transmitting the one or more first communications, an end to the COT (block 730). For example, the BS (using, for example, controller/processor 240) may determine, after transmitting the one or more first communications, an end to the COT, as described above.

As shown in FIG. 7, in some aspects, the process 700 may include transmitting, after the end to the COT, one or more second communications to the UE for receipt using the first quantity of Rx antennas in the first mode (block 740). For example, the BS (using, for example, controller/processor 240, transmit processor 220, TX MIMO processor 230, MOD 232, or antenna 234) may transmit, after the end to the COT, one or more second communications to the UE for receipt using the first quantity of Rx antennas in the first mode, as described above.

The process 700 may include additional aspects, such as any single implementation or any combination of aspects described below or in connection with one or more other processes described elsewhere herein.

In a first aspect, the process 700 includes indicating, to the UE, the end of the COT using at least one of an explicit COT indicator, an SFI, an RxD mode signal, or an attempt to select the COT. In a second aspect, alone or in combination with the first aspect, the process 700 may include receiving, from the UE, a set of CQI feedback messages to indicate a set of Rx antenna configurations for an Rx antenna selection decision. In a third aspect, alone or in combination with one or more of the first and second aspects, the process 700 may include indicating, to the UE, the start of the COT or the end of the COT using signaling on a primary carrier operating on licensed spectrum.

In a fourth aspect, alone or in combination with one or more of the first through third aspects, the process 700 may include transmitting signaling to cause the UE to enable the RxD mode, and the signaling is at least one of an RxD mode activation message, a DMRS, a group common PDCCH, a UE-specific PDCCH, or an indication of a measurement. In a fifth aspect, alone or in combination with one or more of the first through fourth aspects, the process 700 may include transmitting signaling to cause the UE to disable the RxD mode, and the signaling is at least one of an RxD mode deactivation message from the BS, an indication of the end of the COT, or an indication of a measurement. In a sixth aspect, alone or in combination with one or more of the first through fifth aspects, the process 700 may include forgoing transmitting an indication of a grant to the UE to cause the UE to disable the RxD mode.

In a seventh aspect, alone or in combination with one or more of the first through sixth aspects, the process 700 may include receiving, from the UE, an ACK message or a NACK message associated with maintaining a synchronization of the UE and the BS with respect to the RxD mode. In an eighth aspect, alone or in combination with one or more of the first through seventh aspects, the process 700 may include receiving a sounding reference signal associated with maintaining a synchronization of the UE and the BS with respect to the RxD mode.

In a ninth aspect, alone or in combination with one or more of the first through eighth aspects, the process 700 may include transmitting, to the UE, signaling to enable a determination of one or more Rx antennas for the RxD mode, and the signaling is at least one of a PDCCH, a DCI field, a preamble of a PDCCH, or an override indicator of a PDCCH. In a tenth aspect, alone or in combination with one or more of the first through ninth aspects, the process 700 may include receiving a UCI message, from the UE, indicating the one or more antennas for the RxD mode.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above may be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above may not be understood as requiring such separation in all aspects, and it may be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
receiving, from a base station (BS), outside of a channel occupancy time (COT) using a first quantity of receive (Rx) antennas, and in a first mode, a first physical downlink control channel (PDCCH) indicating a start to the COT;
enabling, based on receiving the first PDCCH and after the start of the COT, a receive diversity (RxD) mode for the UE;
receiving, while in the RxD mode and using a second quantity of Rx antennas, a second PDCCH based on enabling the RxD mode and based on transmitting an acknowledgement message (ACK) or a sounding reference signal (SRS);
determining an end to the COT; and
disabling, based on determining the end to the COT, the RxD mode.

2. The method of claim 1, wherein the UE is configured to use the first quantity of Rx antennas before the start of the COT, and
wherein the method further comprises:
activating the second quantity of Rx antennas for use after the start of the COT and during the RxD mode.

3. The method of claim 1, wherein determining the end of the COT comprises:
determining the end of the COT based on at least one of:
a received explicit COT indicator,
a received slot format indicator (SFI),
a received RxD mode signal,
a wait time parameter, or
a result of the BS attempting to select the COT.

4. The method of claim 1, further comprising:
transmitting, to the BS, a set of channel quality information (CQI) feedback messages to indicate a set of Rx antenna configurations for an Rx antenna selection decision.

5. The method of claim 1, wherein determining the start of the COT or the end of the COT is based on signaling from a primary carrier operating on licensed spectrum.

6. The method of claim 1, wherein enabling the RxD mode comprises:
enabling the RxD mode based on at least one of:
a received message from the BS,
a detected demodulation reference signal (DMRS),
a detected group common PDCCH,
a detected UE-specific PDCCH,
a traffic frequency determination,
a signal to noise ratio metric,
a received energy metric, or
a preamble correlation.

7. The method of claim 1, wherein disabling the RxD mode comprises:
disabling the RxD mode based on at least one of:
a received message from the BS,
a failure to detect a grant for a threshold period of time,
the determining of the end of the COT,
a traffic frequency determination, or
a received energy metric.
8. The method of claim 1, further comprising:
transmitting, to the BS, the ACK or a negative acknowledgement (NACK) message to maintain a synchronization of the UE and the BS with respect to the RxD mode.
9. The method of claim 1, further comprising:
transmitting the SRS to maintain a synchronization of the UE and the BS with respect to the RxD mode.
10. The method of claim 1, further comprising:
determining one or more antennas for the RxD mode based on at least one of:
a received PDCCH,
a downlink control information (DCI) field,
a detection of a preamble of a PDCCH, or
a determination override indicator of a PDCCH.
11. The method of claim 10, further comprising:
determining the one or more antennas for the RxD mode; and
transmitting an uplink control information (UCI) message to the BS to indicate the one or more antennas for the RxD mode.
12. The method of claim 1, further comprising:
monitoring, using a first antenna of one or more antennas for the RxD mode, a first subband or bandwidth;
monitoring, using a second antenna of the one or more antennas, a second subband or bandwidth; and
wherein receiving the second PDCCH, comprises:
receiving the second PDCCH using at least one of the first antenna or the second antenna based on monitoring the first subband or bandwidth and the second subband or bandwidth.
13. The method of claim 1, wherein enabling the RxD mode comprises:
enabling the RxD mode based on at least one of:
a listen-before-talk (LBT) mode not being enabled, or
an LBT procedure being within a threshold period from completion.
14. A method of wireless communication performed by an apparatus of a base station (BS), comprising:
transmitting, to a user equipment (UE) using a first quantity of receive (Rx) antennas, in a first mode, and outside of a channel occupancy time (COT), a first physical downlink control channel (PDCCH) indicating a start to the COT;
transmitting, after transmitting the first PDCCH, a second PDCCH to the UE for receipt using a second quantity of Rx antennas in a receive diversity (RxD) mode based on receiving an acknowledgement message (ACK) or a sounding reference signal (SRS);
determining, after transmitting the second PDCCH, an end to the COT; and
transmitting, after the end to the COT, one or more communications to the UE for receipt using the first quantity of Rx antennas in the first mode.
15. The method of claim 14, further comprising:
indicating, to the UE, the end of the COT using at least one of:
an explicit COT indicator,
a slot format indicator (SFI),
an RxD mode signal, or
an attempt to select the COT.
16. The method of claim 14, further comprising:
receiving, from the UE, a set of channel quality information (CQI) feedback messages to indicate a set of Rx antenna configurations for an Rx antenna selection decision.
17. The method of claim 14, further comprising:
indicating, to the UE, the start of the COT or the end of the COT using signaling on a primary carrier operating on licensed spectrum.
18. The method of claim 14, further comprising:
transmitting signaling to cause the UE to enable the RxD mode, and
wherein the signaling is at least one of:
an RxD mode activation message,
a demodulation reference signal (DMRS),
a group common PDCCH,
a UE-specific PDCCH, or
an indication of a measurement.
19. The method of claim 14, further comprising:
transmitting signaling to cause the UE to disable the RxD mode, and
wherein the signaling is at least one of:
an RxD mode deactivation message from the BS,
an indication of the end of the COT, or
an indication of a measurement.
20. The method of claim 14, further comprising:
forgoing transmitting an indication of a grant to the UE to cause the UE to disable the RxD mode.
21. The method of claim 14, wherein the ACK or a negative acknowledgement (NACK) message is associated with maintaining a synchronization of the UE and the BS with respect to the RxD mode.
22. The method of claim 14, wherein the SRS is associated with maintaining a synchronization of the UE and the BS with respect to the RxD mode.
23. The method of claim 14, further comprising:
transmitting, to the UE, signaling to enable a determination of one or more Rx antennas for the RxD mode, and
wherein the signaling is at least one of:
a PDCCH,
a downlink control information (DCI) field,
a preamble of a PDCCH, or
an override indicator of a PDCCH.
24. The method of claim 23, further comprising:
receiving an uplink control information (UCI) message, from the UE, indicating the one or more antennas for the RxD mode.
25. A user equipment (UE) for wireless communication, comprising:
a memory; and
one or more processors coupled to the memory, the memory and the one or more processors configured to:
receive, from a base station (BS), outside of a channel occupancy time (COT) using a first quantity of receive (Rx) antennas, and in a first mode, a first physical downlink control channel (PDCCH) indicating a start to the COT;
enable, based on receiving the first PDCCH and after the start of the COT, a receive diversity (RxD) mode for the UE;
receive, while in the RxD mode and using a second quantity of Rx antennas, a second PDCCH based on enabling the RxD mode and based on transmitting an acknowledgement message (ACK) or a sounding reference signal (SRS);

determine an end to the COT; and disable, based on determining the end to the COT, the RxD mode.

26. The UE of claim 25, wherein the UE is configured to use the first quantity of Rx antennas before the start of the COT, and wherein the one or more processors are further configured to:

activate the second quantity of Rx antennas for use after the start of the COT and during the RxD mode.

27. The UE of claim 25, wherein the one or more processors, when determining the end of the COT, are configured to:

determine the end of the COT based on at least one of:

a received explicit COT indicator, a received slot format indicator (SFI), a received RxD mode signal, a wait time parameter, or a result of the BS attempting to select the COT.

28. A base station (BS) for wireless communication, comprising:

a memory; and one or more processors coupled to the memory, the memory and the one or more processors configured to:

transmit, to a user equipment (UE) using a first quantity of receive (Rx) antennas, in a first mode, and outside of a channel occupancy time (COT), a first physical downlink control channel (PDCCH) associated with indicating a start to the COT;

transmit, after transmitting the first PDCCH, a second PDCCH to the UE for receipt using a second quantity of Rx antennas in a receive diversity (RxD) mode based on transmitting an acknowledgement message (ACK) or a sounding reference signal (SRS);

determine, after transmitting the second PDCCH, an end to the COT; and transmit, after the end to the COT, one or more communications to the UE for receipt using the first quantity of Rx antennas in the first mode.

29. The BS of claim 28, wherein the one or more processors are further configured to:

indicate, to the UE, the end of the COT using at least one of:

an explicit COT indicator, a slot format indicator (SFI), an RxD mode signal, or an attempt to select the COT.

30. The BS of claim 28, wherein the one or more processors are further configured to:

receive, from the UE, a set of channel quality information (CQI) feedback messages to indicate a set of Rx antenna configurations for an Rx antenna selection decision.

* * * * *